June 27, 1967

C. RHODES 3,328,790

DISPLAY DEVICES

Filed Aug. 5, 1964

INVENTOR
CONSTANTINE RHODES

BY
*Spencer E. Olson*

ATTORNEY

June 27, 1967

C. RHODES 3,328,790

DISPLAY DEVICES

Filed Aug. 5, 1964

INVENTOR
CONSTANTINE RHODES

BY

ATTORNEY

FIG. 5

INVENTOR
CONSTANTINE RHODES
BY
ATTORNEY

United States Patent Office 3,328,790
Patented June 27, 1967

3,328,790
DISPLAY DEVICES
Constantine Rhodes, Framingham, Mass., assignor to Sylvania Electric Products Inc., a corporation of Delaware
Filed Aug. 5, 1964, Ser. No. 387,681
11 Claims. (Cl. 340—324)

This invention relates to display devices and more particularly to a solid state electroluminescent bar type display device wherein the length or height of an illuminated bar corresponds to the magnitude of the quantity being measured.

A bar type display may be characterized as an indicating device where the length or height of the indicating medium is proportional to the magnitude of the measured quantity. For example, a mercurial thermometer is a simple form of a bar type display, the height of the column of mercury being proportional to the temperature. Bar type display devices have potentially wide application in industrial process controls, aircraft instrumentation and, in general, in systems which require the mounting of a large number of displays on a relatively small instrument panel. To be useful in many of the potential applications, such display devices must be capable of responding rapidly to digital input signals, must occupy a minimum amount of space and must operate under a wide variety of environmental conditions.

Electro-mechanical devices for providing bar type displays are well known to the art, but these devices generally have the disadvantages of slow response time, of being relatively bulky and of limited accuracy when subjected to shock and vibration, and consequently have found only limited acceptance as display devices. Electrical devices are also known for providing bar type displays, generally employing sealed glass envelopes operating at low internal pressures and thus subject to catastrophic failure. Furthermore, each element of the electrical display requires a separate control driver, thereby requiring extensive control circuitry and a substantial amount of operating power.

While electroluminescent display devices are well known to the art, they have not heretofore been readily adaptable to the bar type display application. FIG. 1 of U.S. Patent No. 3,054,929 illustrates a section of a typical crossed-grid electroluminescent structure commonly employed in display devices, and FIG. 2 thereof illustrates the electrical equivalent of the crossed-grid electroluminescent structure. A desired element of the crossed-grid structure is illuminated by applying appropriate voltages to the respective horizontal and vertical conductors which intersect at the element to be illuminated. In the normal mode of operation only one element of the structure is illuminated at any one time. Thus, assuming a one-hundred element device, if the device is operated as a bar type display, each element would be illuminated one-hundredth, or one percent, of the time, and because of the poor illumination, the resultant display would be difficult, if not impossible, to read.

Accordingly, it is a principal object of this invention to provide an improved bar type display device which employs only solid state components.

It is another object of this invention to provide a bar type display device of compact size and requiring minimum power for operation.

It is a further object of this invention to provide a bar type display device which responds rapidly to binary input signals.

Still another object of this invention is to provide a bar type display device which utilizes electroluminescent panels as the bar elements.

Yet another object of this invention is to provide a bar type display device requiring a minimum number of control circuits.

An additional object of this invention is to provide a bar type display device utilizing electroluminescent panels as the bar elements wherein each bar element to be illuminated is subjected to an excitation potential at least fifty percent of the time, thereby providing an adequate light level for reading the display.

Briefly, the invention resides in the utilization of an electroluminescent structure operated in conjunction with a time sharing control system such that signals applied to the input terminals of the time sharing control system are decoded to provide the necessary excitation voltages at the electroluminescent structure resulting in an illuminated bar display, the length of the illuminated bar being proportional to the magnitude of the signal inputs to the time sharing control system.

The electroluminescent structure consists of an elongated rectangular base, such as a plate of glass, upon which is mounted a first array of electrode elements suitably distributed along the length of the base. A layer of phosphor material, having approximately the same dimensions as the rectangular base, is placed upon the first array of electrode elements, and a second plurality of electrode elements, suitably displaced from one another, is affixed to the layer of phosphor material to form a ladder-like array upon the layer of phosphor material. The electrode elements of the first array define a plurality of groups and associated with each group of the first array is a number of electrode elements of the second array. When a voltage is applied between an electrode of the first array and an associated electrode element or elements of the second array, the portion of the phosphor layer under that electrode element or elements of the second array emits light.

The time sharing control system provides the excitation voltages necessary to illuminate selected bar elements of the display each one-half of the time, thereby providing a display having sufficient and relatively uniform intensity of illumination. This is accomplished by decoding the input data signals into first and second sets of driving signals which are alternately applied to different portions of the electroluminescent structure under control of a strobing pulse which may be provided, for example, by a free-running multivibrator. The multivibrator has a frequency somewhat higher than twice the flicker response rate of the human eye whereby the eye perceives a continuous display.

In operation, the display device is illuminated from the lower end upward to include the bar element of the second array representative of the magnitude of the applied signal. During the first half of the time-sharing cycle, excitation potential is applied between the second array electrode element representing the magnitude of the applied signal and the other second array electrodes therebelow in the group containing that electrode element and the first array electrode element associated with that group. During the second half of the cycle, energizing potential is applied between all groups of second array elements lying below the above-mentioned group and all of the first array elements associated with the latter groups. Thus, each element of the display, between the bottom and the element representative of the magnitude of the input signal, is illuminated one-half of the time.

The foregoing and other objects, features and advantages of the invention, and a better understanding of its construction and operation will become apparent from the following detailed description taken in conjunction with the accompanying drawings, in which.

Figures 1, 2, 3:
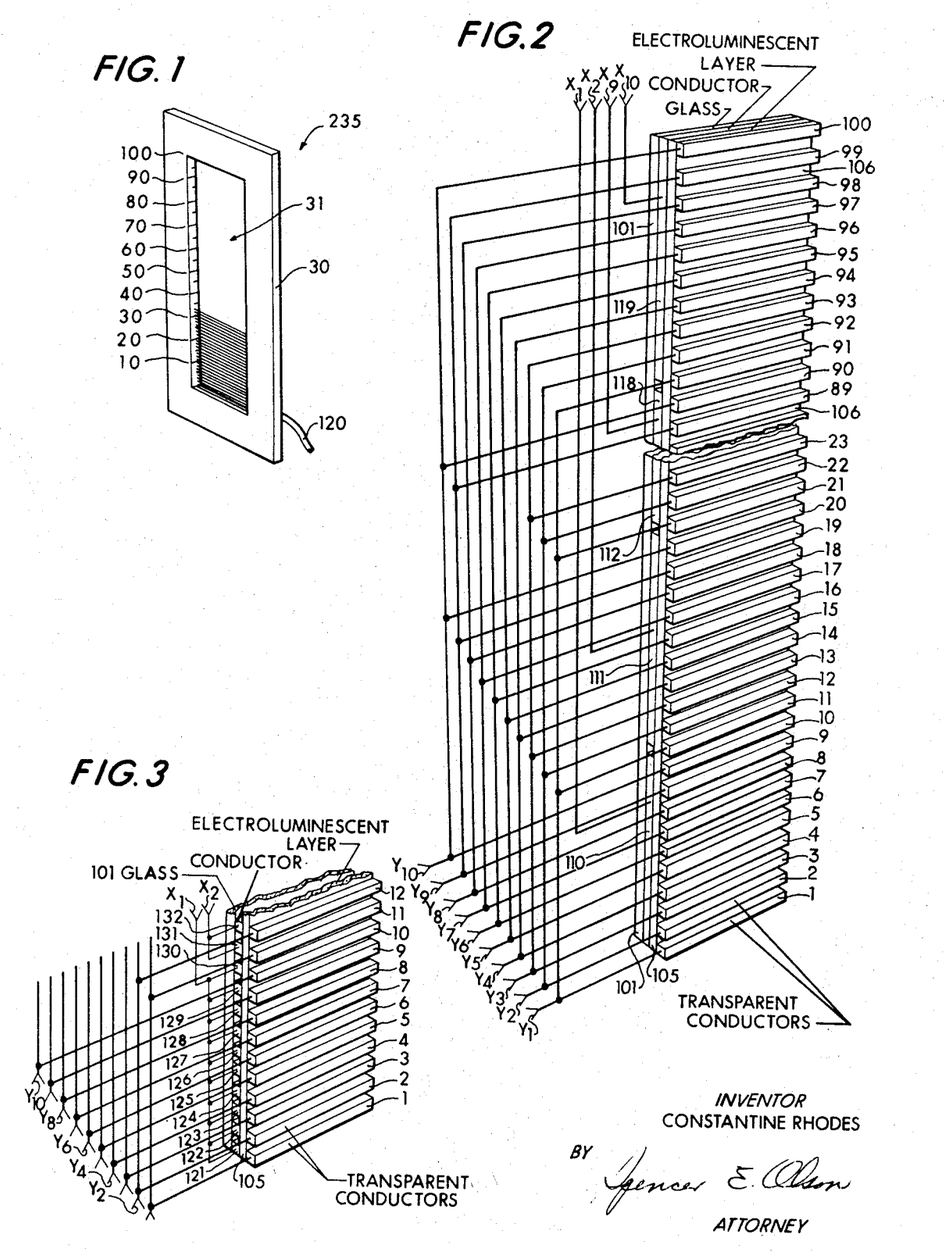
FIG. 1 is a perspective view of a typical indicator device.
FIG. 2 is a fragmentary perspective view of one embodiment of an electroluminescent structure useful in the practice of the invention.
FIG. 3 is a fragmentary perspective view of an alternative construction of the electroluminescent structure of FIG. 2.

Referring to FIG. 1, the bar display device 235 of the type to which this invention is addressed typically comprises a frame 30 within which an electroluminescent structure 31 is supported. The frame has scale markings along the edges thereof to facilitate reading the height of the bar. In the illustrated example, the bar is illuminated to a height of thirty-four units from the bottom of the electroluminescent structure. One or more indicator devices of this type may be mounted in a display panel (not shown), with the control circuitry therefor, which may be located remotely, connected thereto by a cable 120.

FIG. 2 illustrates in detail one embodiment of the electroluminescent structure 31 of FIG. 1, having one hundred elements so as to give a bar type display in one hundred discrete increments. The structure comprises a glass plate 101 upon which is supported a first array of ten separated electrode elements extending transversely of the length dimension of the plate, five of which are shown at 110, 111, 112, 118 and 119. A layer of electroluminescent material 105 is applied over these electrode elements, in a manner well known in the art, and on top of this layer is affixed a second array of one hundred transparent electrode elements 1 through 100 (25 through 88 are not shown), oriented transversely of the length dimension of the glass plate 101. Thus, each electrode element of the first array has associated with it ten electrode elements of the second arry, thereby forming ten groups of ten electrode elements each. To provide suitable illumination characteristics, the upper surface 106 of the layer of electroluminescent material 105 may be coated with an appropriate non-linear resistance material.

To each of the electrode elements 110 through 119 of the first array is connected one of ten input leads $X_1$ through $X_{10}$ ($X_4$ through $X_8$ not shown), respectively, with $X_1$ connected to electrode element 110, $X_2$ connected to electrode element 111, and so on, with $X_{10}$ connected to electrode element 119. A second set of ten input leads $Y_1$ through $Y_{10}$ provides electrical connections to the one hundred electrode elements of the second array, each of the ten input leads being connected in parallel to a corresponding electrode element in each of the aforementioned ten groups. For example, input lead $Y_1$ is connected to electrode elements 1, 11, 21, 31, 41, 51, 61, 71, 81, and 91; input lead $Y_2$ is connected to electrode elements 2, 12, 22, 32, 42, 52, 62, 72, 82, and 92; and so on, with input lead $Y_{10}$ connected to electrode elements 10, 20, 30, 40, 50, 60, 70, 80, 90, and 100.

Upon application of a suitable potential to one of the electrode elements of the first array of conductors, say element 111, and the coincident application of a suitable potential of opposite polarity to one of the electrode elements of the second array, for example, electrode element 11, the electroluminescent material between these electrode elements is subjected to an electrical field causing the material to luminesce. The properties of the electroluminescent material cause the luminescence to be localized in the area beneath electrode element 11, thereby forming one bar element of the bar type display. When an electrical potential is applied to electrode element 111, to thereby provide an equipotential plane, any one or all of the bar elements defined by electrodes 11 through 20 may be illuminated by applying a suitable potential to the respective electrode elements.

An alternate construction of the electroluminescent structure, partially illustrated in FIG. 3, employs one hundred transparent electrodes elements, of which only 121 through 132 are shown, in the first array instead of the ten electrode elements of the structure of FIG. 2. That is, electrode element 110 in the structure of FIG. 2 is replaced by electrodes 121 through 130 in the structure of FIG. 3, and the ten electrodes connected together and to the $X_1$ input lead. In a similar fashion, the remaining electrodes are connected in groups of ten and to the appropriate X input leads, thereby retaining the same effective grouping (electrically) of electrode elements into ten equipotential planes, so that the operation of the structures of FIGS. 2 and 3 is identical.

Figure 4:
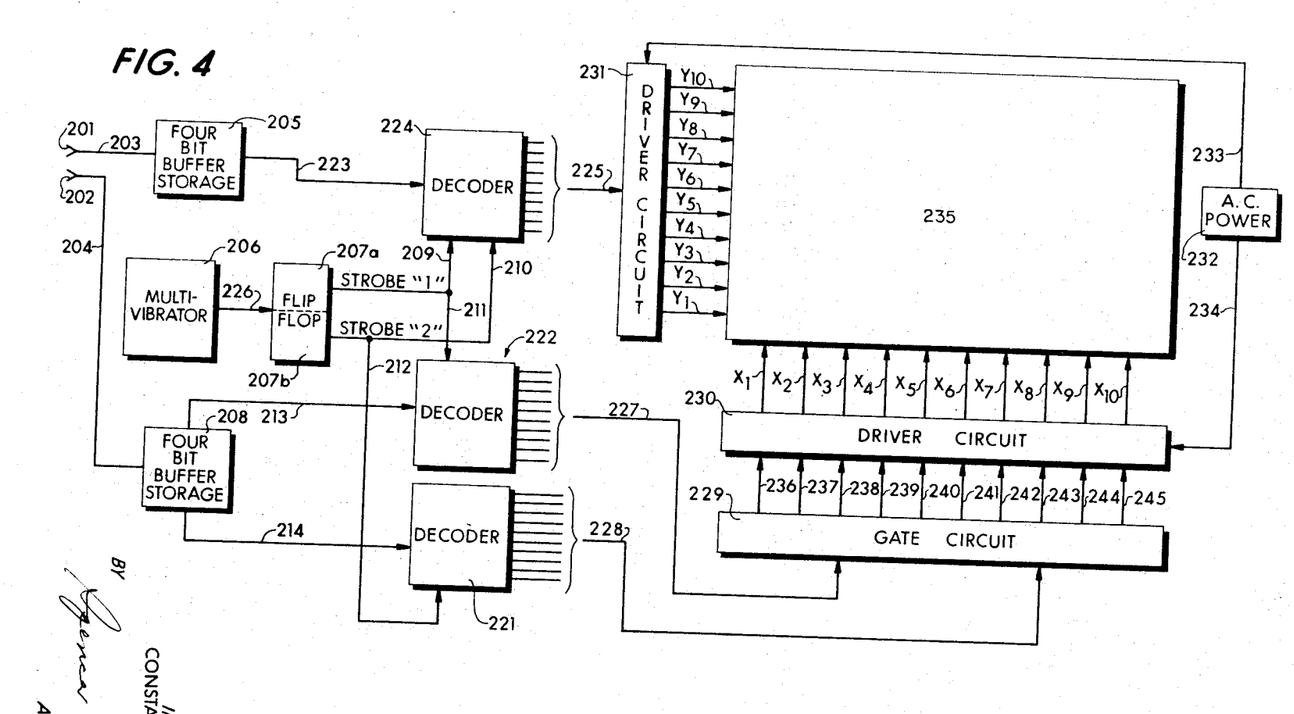
FIG. 4 is a block diagram of one embodiment of circuitry for controlling energization of the display device of FIG. 1 or 2.

Referring now to FIG. 4, the display device 235 is responsive to binary coded data from a source (not shown), such as an analog to digital converter, representative of magnitude of quantity to be displayed. In the present system in which the device is adapted to indicate values between zero and one-hundred, the "units" data is applied to input terminal 201 and the "tens" data is applied to input terminal 202. The "units" data, consisting of a four bit word, is applied via line 203 to a four bit buffer storage 205, and the "tens" data, also a four bit word, is applied via line 204 to a four bit buffer storage 208. The output of buffer storage 205 is applied via cable 223 to a first decoder 224, and the output of buffer storage 208 is applied to two decoders 222 and 221 via cables 213 and 214, respectively. Timing of the control circuitry is provided by a free-running multivibrator 206, the output pulses of which are applied to a flip-flop 207 via line 226. One output terminal 207a of the flip-flop is connected via line 209 to decoder 224, and via line 211 to decoder 215, and the other output terminal 207b is connected via line 210 to decoder 224, and via line 212 to decoder 221. Decoder 224 has ten output terminals which are coupled via a ten-line cable 225 to a driver circuit 231, the outputs of which, in turn, are connected to lines $Y_1$ through $Y_{10}$ of display device 235. Decoder 222 also has ten output terminals which are connected via a ten-line cable 227 to a gate circuit 229, and the output terminals of decoder 221, also ten in number, are also connected via a ten-line cable 228 to the gate circuit 229. The output terminals of gate circuit 229 are connected via lines 236 through 245 to a driver circuit 230 having ten output terminals respectively connected to lines $X_1$ through $X_{10}$ of the display device 235. An alternating current power source 232 is connected via lines 233 and 234 to the driver circuits 231 and 230, respectively.

Figure 5:
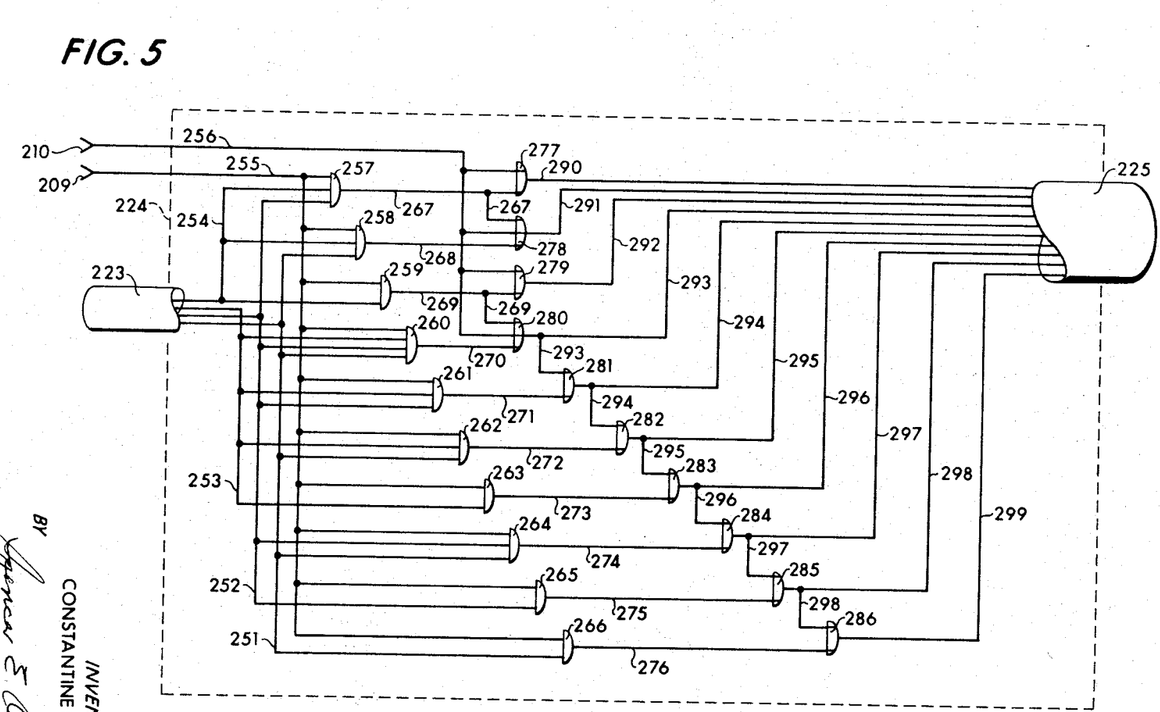
FIGS. 5, 6 and 7 are respectively block diagrams of decoders 224, 222 and 221 of the system of FIG. 4; and, FIG. 8 is a schematic representation of the gate circuit 229 and the drive circuits 230 and 231 of the system of FIG. 4.

The decoder 224, shown in logic diagram form in FIG. 5, decodes the binary coded decimal data received from buffer storage 205 to provide suitable gating signals for controlling driver circuit 231. The binary coded data is received from buffer storage 205 on lines 251, 252, 253 and 254 of cable 223 which respectively transmit the first, second, third and fourth bits of the word. The lines 251 through 254 are selectively connected to input terminals of ten AND gates 257 through 266 in the following manner: line 251 is connected to AND gates 258, 260, 262, 264 and 266; line 252 is connected to AND gates 257, 260, 261, 264 and 265; line 253 is connected to AND gates 260, 261, 262 and 263; and, line 254 is connected to AND gates 257, 258 and 259. All of the AND gates 257 through 266 are simultaneously enabled by a pulse from flip-flop 207, designated stroke "1," applied via line 255 to one terminal of each of the AND gates 257 through 266. Any one of the AND gates is activated and generates an output signal only when each of its inputs is at a predetermined level; for example, the requirement may be that the signal at each input is equivalent to a binary ONE.

The outputs of AND gates 257 through 266 are selectively applied to an input terminal of one or more of ten OR gates 277 through 286 in the following manner: AND gate 257 is applied to OR gates 277 and 278; AND gate 258 is applied to OR gate 278; AND gate 259 is applied to OR gates 279 and 280; and AND gates 260 through 266 are connected to OR gates 280 through 286, respectively. OR gates 277 through 280 each have a pulse from flip-flop 207, designated strobe "2," applied to one of its input terminals via terminal 210 and line 256. Further, the second input terminal of each of OR gates 281 through 286 is respectively connected to the output terminal of OR gates 280 through 285. The outputs of the OR gates are coupled via lines 290 through 299, respectively, of cable 225 to the driver circuit 231.

Figure 6:
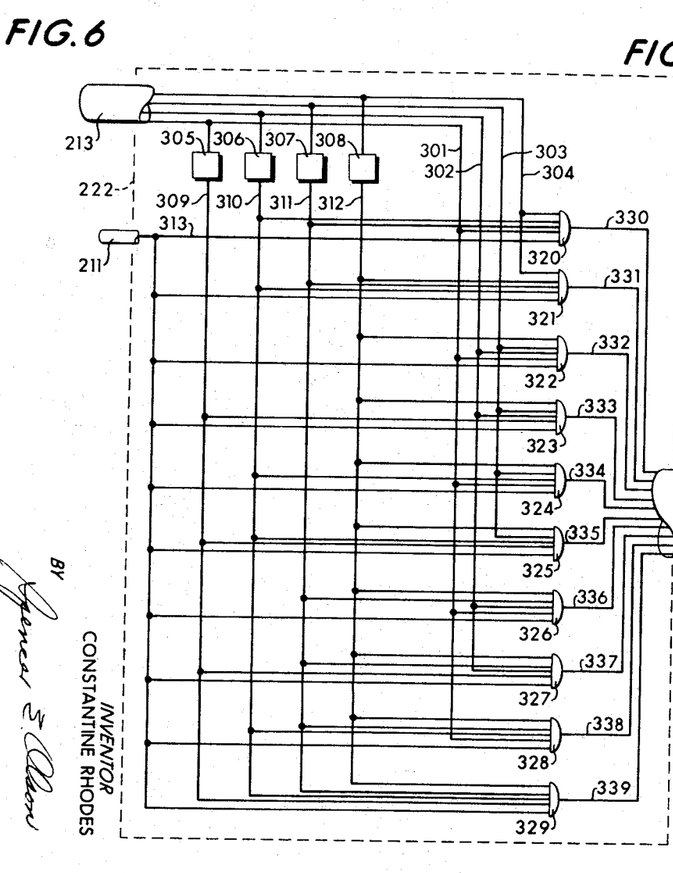

The decoder 222, illustrated in FIG. 6, is a binary coded decimal-to-decimal decoder to which the four bit binary data from buffer storage 208 is applied via lines 301, 302, 303 and 304 of cable 213. The lines 301 through 304 are selectively connected to input terminals of ten AND gates 320 through 329, and to the input terminals of inverter circuits 305, 306, 307 and 308, respectively. The outputs of the inverter circuits 305 through 308, which are of opposite polarity relative to the inputs, are applied via lines 309 through 312 to appropriate input terminals of AND gates 320 through 329. The strobe "1" pulse from flip-flop 207 is also applied to one of the input terminals of each of AND gates 320 and 329 via cable 211 and line 313. The outputs of the AND gates are coupled via respective lines 330 through 339 of cable 227 to gate circuit 229.

Figure 7:
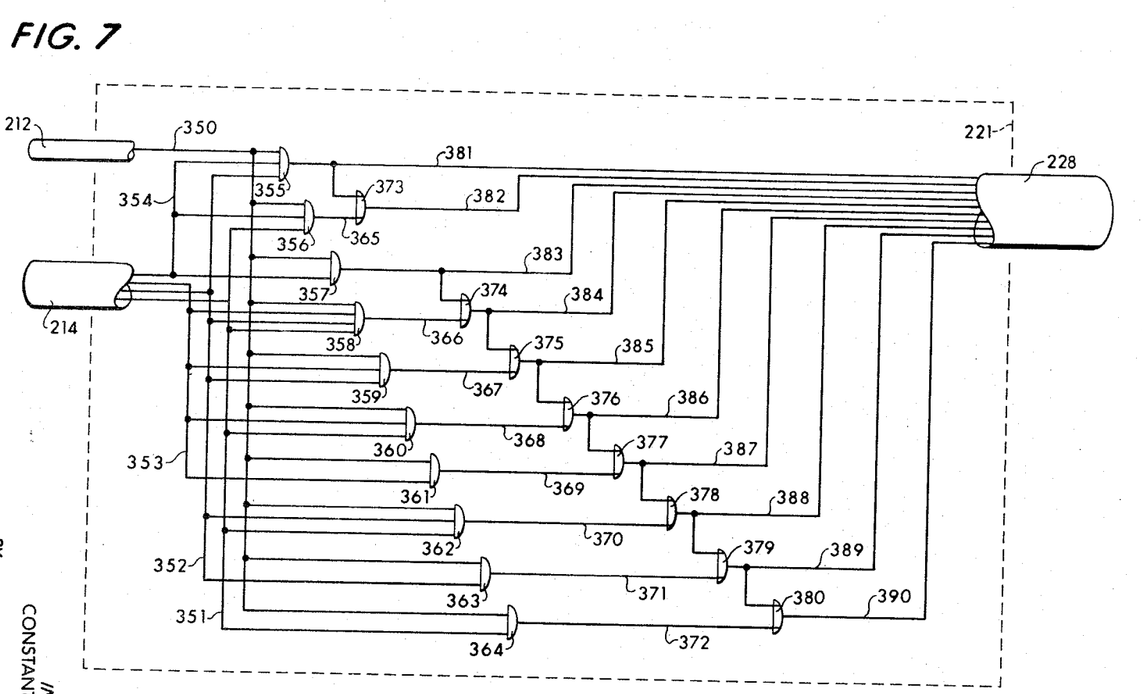

The decoder 221, illustrated in FIG. 7, decodes the binary coded decimal data to signals representing decimal numbers equal to the binary number and all lower decimal numbers. For example, if the number in binary form is a six, the decoder provides output signals equivalent to decimal numbers six, five, four, three, two and one. The four bits of the binary word are received on respective lines 351, 352, 353 and 354 of cable 214 and applied to selected ones of the input terminals of ten AND gates 335 through 364. The strobe "2" pulse from flip-flop 207 is also applied to an input terminal of each of the gates. The output of AND gate is connected via line 381 through cable 228 to the gate circuit 229 and also to an input terminal of an OR gate 373. The output of AND gate 356 is connected via line 365 to a second input terminal of OR gate 373, the output of the latter being applied via line 382 of cable 228 to the gate circiut 229. The output of AND gate 357 is applied in parallel to gate circuit 229, via line 383, and to one input terminal of OR gate 374. The output terminals of AND gates 358 through 364 are connected via lines 366 through 372, respectively, to respective input terminals of OR gates 374 through 380. The output terminals of OR gates 374 through 379 are connected to second input terminals of OR gates 375 through 380, respectively, and the output terminal of each of OR gates 374 through 380 is connected via respective lines 384 through 390 to the gate circuit 229.

Figure 8:
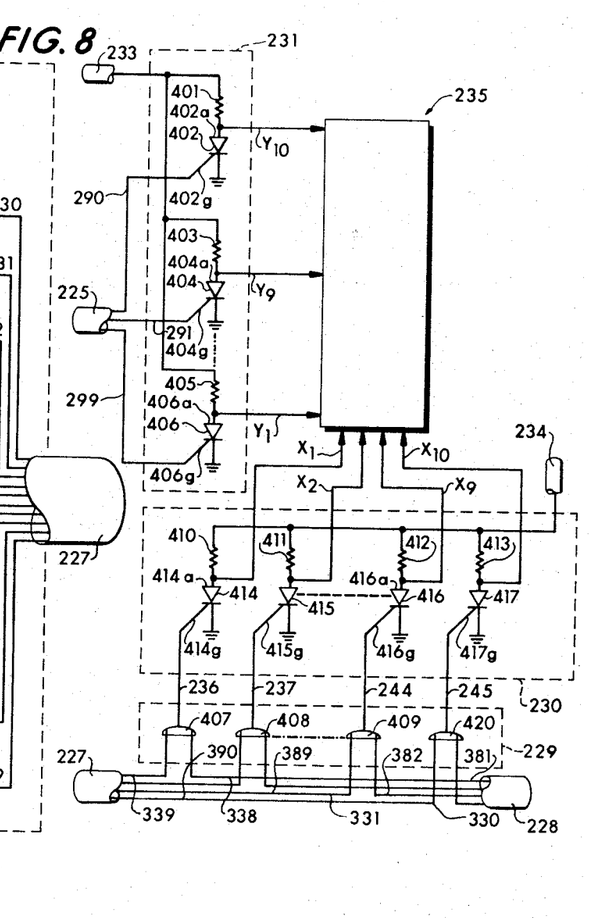

FIG. 8 schematically shows the interconnections between the decoders, the gate and driving circuits, and the display device 235, only a few of the lines of cables 225, 227 and 228 from the decoders being shown in the interest of clarity. In a preferred embodiment, the drive circuit 231 comprises ten silicon controlled rectifier (SCR) driving circuits, one for each drive line $Y_1$ through $Y_{10}$ of display device 235, three of which are shown at 402, 404 and 406. The lines of cable 225 are connected to the trigger or gate electrode of a respective SCR, the cathodes of each of which are connected to ground. With particular reference to line 290, it is connected to the gate electrode 402g of SCR 402, the anode 402a of which is connected via resistor 401 to line 233 which, in turn, is connected to the alternating current power source 232. The $Y_{10}$ drive line is connected directly to the anode 402a of SCR 402. The remaining nine lines 291 through 299 are similarly connected to the gate electrode of their respective SCR, the anodes of which are connected to respective Y drive lines, and through suitable resistors to the alternating current source 232.

The outputs from the decoders 221 and 222 are connected via cables 228 and 227, respectively, to the gate circuit 229. The gate circuit 229 consists of ten two-input OR gates, only four of which are shown at 407, 408, 409 and 420. The respective output lines 236 through 245 therefrom are applied to drive circuit 230, which is seen to be identical in construction to the just-described drive circuit 231. Considering line 236, for example, it is connected directly to the gate electrode 414g of SCR 414, the cathode of which is grounded and whose anode 414a is connected via resistor 410 and line 234 to the alternating current power source 234. The anode is also connected to the $X_1$ drive line of the display device 235. The other nine SCR driver circuits are similarly connected to respective drive lines $X_2$ through $X_{10}$. The disclosed SCR drive circuits are connected in what is commonly known as a parallel drive mode wherein the anode resistor, for example resistor 401, has a value of the order of 100K ohms. When a suitable signal is applied to the gate 402g, the SCR conducts causing its resistance to be significantly lower than that of resistor 402 with the result that a negligible voltage, insufficient to illuminate the electroluminescent element, is applied to the drive line $Y_{10}$ of the display device. However, when the SCR gate is at ground potential, the SCR does not conduct, and essentially the total voltage from alternating current source 232 is applied to line $Y_{10}$ and the associated electroluminescent elements.

The operation of the invention and the function of its constituent elements will be better understood from the following detailed description of how the binary coded decimal data representing the number ninenty-four actuates a display device 235 of the construction of FIG. 2 to illuminate the bar to a height of ninety-four bar elements. The binary coded decimal equivalent of the number four, i.e., 0100, is applied to input terminal 201 (FIG. 4) and is transmitted via line 203 to the four bit buffer storage 205. The binary coded decimal equivalent of the number nine, i.e., 1001, is applied to input terminal 202 and is transmitted via line 204 to the four bit buffer storage 208. The binary four, 0100, is transferred from storage over lines 251 through 254 of cable 223 to decoder 224, where the third bit of the data word (as counted from the right), i.e., a logical "one," is applied via line 253 to the input terminals of AND gates 260 through 263. The binary bits on lines 251, 252 and 254 are logical "zero's" and are selectively applied to input terminals of AND gates 257, 258 and 260 through 266. As mentioned previously, any one of AND gates 257 through 266 yields an output only when each of its inputs is equivalent to a logical "one". Thus, when the pulse representing the strobe "1" signal is received on line 255, only AND gate 263 yields an output signal. This output signal is transmitted on line 273 to OR gate 283 which produces an output signal on line 296. By means of the cascaded OR gates 284, 285 and 286, output signals also appear on lines 297, 298 and 299 and are transmitted via cable 225 to the drive circuit 231 to activate the SCR driver circuits associated with lines $Y_1$, $Y_2$, $Y_3$ and $Y_4$. These signals render these SCRs non-conducting and cause the alternating current voltage to be applied to all of the electrode elements connected to lines $Y_1$, $Y_2$, $Y_3$ and $Y_4$; namely, the lower four in each of the ten groups.

At the same time the binary nine, 1001, is transmitted from the buffer storage via lines 301, 302, 303 and 304 of cable 223 to decoder 222 and over lines 351 through 354 of cable 214 to decoder 221. Any one of the AND gates 320 through 329 of decoder 222 yields a signal output only when all of its signal inputs are equivalent to a logical "one," and further, only one AND gate may be activated at a time because of the decoding scheme used. With the binary nine, 1001, the first and fourth bits represent logical "one" equivalent signals on lines 301 and 304, respectively, and the second and third bits represent logical "zero" equivalent signals on lines 302 and 303, respectively. By the action of inverters 306 and 307, logical "one" signal equivalents are transmitted on lines 310 and 311, respectively. Thus when a signal representing a strobe "1" pulse is received on line 313 via cable 211, only AND gate 320 provides an output signal. This output signal is transmitted over line 330 of cable 227 to OR gate 420 of gate circuit 229 and is effective to ground the gate electrode 417g of SCR 417. SCR 417 is rendered non-conducting and the full alternating current voltage is applied to line $X_{10}$ and electrode 119. Since the full alternating current voltage of opposite polarity is applied to electrode elements 91, 92, 93 and 94 through the action of decoder 224 on the binary four, the electroluminescent material between these elements and electrode element 119 luminesces to illuminate bar elements 91, 92, 93, and 94. These elements remain illuminated for the duration of the strobe "1" pulse.

At the termination of the strobe "1" pulse, flip-flop 207b generates the strobe "2" pulse which is transmitted via cables 210 and 212 to decoders 224 and 221, respectively. Upon receipt of the strobe "2" pulse (representing a logical "one" signal) by decoder 224, it is applied via line 256 to an input terminal of each of OR gates 277 through 280 resulting in output signals on lines 290 through 293. By reason of the previously described cascading of OR gates 282 through 286, the output signal on line 293 also causes output signals to appear on lines 294 through 299. Thus, during the strobe "2" pulse, output signals appear on all of lines 290 through 299 which are transmitted via cable 225 to gate circuit 231 and applied to the gate electrodes of the SCR's associated with lines $Y_1$ through $Y_{10}$, cutting all ten SCR's off so as to apply full alternating current voltage from source 232 to the lines $Y_1$ through $Y_{10}$ of the display device.

Coincident with the above operation, the strobe "2" pulse is also applied to an input terminal of each of AND gates 355 through 364 of decoder 221 along with the application of the four bit binary nine, 1001, to lines 351, 352, 353 and 354, respectively. Since the first and fourth bits of the binary nine represents logical "one" signal levels, while the second and third bits represent logical "zero" signal levels, only AND gates 356, 357 and 364 have all of their input terminals at a logical "one" level, causing output signals to appear only on their respective lines 365, 383 and 372. The signal on line 365 passes through OR gate 373 to line 382. The signal on line 383 is applied to OR gate 374, and with the cascading of OR gates 375 through 380, output signals also appear on lines 384 through 390. The signals on lines 382 through 390 are transmitted via cable 228 to the OR gates of gate circuit 229, resulting in output signals on lines 236 through 244. These output signals are applied to the gate electrodes of the SCR's in the driver circuit 230 associated with drive lines $X_1$ through $X_9$, rendering these SCR's non-conducting with the result that the alternating current voltage from the source 232 is applied to lines $X_1$ through $X_9$.

With the above described voltages applied to lines $Y_1$ through $Y_{10}$ and $X_1$ through $X_9$, the bar elements defined by electrode elements 1 through 90 are illuminated for the duration of the strobe "2" pulse. With the strobe "1" and strobe "2" pulses generated at a rate greater than twice the flicker response rate of the human eye, the eye perceives a continuous bar type display illuminated to a height of ninety-four bar elements.

While the decoding of only one binary member has been described to illustrate how the control system operates to illuminate the display device to a height corresponding to the magnitude of the binary number, it will be apparent that any other number from one to one hundred can be similarly decoded and presented. Key to the apparent continuous illumination of the bar to the proper height is the alternate energization of those electroluminescent elements in the uppermost group corresponding to the maximum value of the number and all elements of that group therebelow, and all elements of all groups below the uppermost group at a rate higher than the fllicker response rate of the human eye. This is accomplished by the strobe "1" and "2" pulses, of equal duration, which coact with the binary input information to cause each element of the bar (below the maximum height) to be illuminated 50% of the time.

And, although the control circuit has been described in connection with the electroluminescent display device of FIG. 2, it will be evident that its operation with the structure of FIG. 3 is identical.

Although the above-described preferred embodiment illustrates a system whereby binary coded decimal data is operated upon to produce a bar type display illuminated to a height equivalent to the magnitude of the binary coded decimal data, it is not intended to be limited to this particular configuration. It is obvious that any form of binary data may be suitably decoded, utilizing known decoding techniques, to provide suitable driving signals. Also, analog signals may be suitably converted and decoded to provide such driving signals. It is also evident that the SCR driver circuits, as illustrated, may be replaced by equivalent devices, such as relays, etc., without departing from the spirit of the invention. It will be further understood that various omissions and substitutions and different applications may be made by those skilled in the art without departing from the spirit of the invention. It is applicant's intention, therefore, to be limited only as indicated by the scope of the appended claims.

What is claimed is:

1. Display apparatus for producing an illuminated bar having a length corresponding to the magnitude of an applied signal, comprising, in combination: an elongated display device having upper and lower ends and including a first array of parallel electrode elements disposed transversely of and equally spaced along the length dimension of said device, said first array elements being arranged in a plurality of groups containing an equal number of elements, a second array of electrode elements coextensive with said first array and parallel thereto arranged to provide a like plurality of equipotential planes, one for each of the groups of elements in said first array, and a layer of electroluminescent material interposed between said first and second arrays of elements; a source of electrical potential for energizing said device; and circuit means connected to said source of potential and operative in response to the applied signal to alternately apply said electrical potential between the element of said first array representing the magnitude of said applied signal and the other first array elements therebelow in the group containing that element and the equipotential plane of said second array associated with that group, and between all the first array elements below the just-mentioned group and all of the equipotential planes associated therewith, at a rate sufficiently high to provide an apparent continuously illuminated bar extending from the lower end of said device to the first array element representing the magnitude of said applied signal.

2. Apparatus in accordance with claim 1 wherein said circuit means includes means for generating alternate first and second strobe pulses of substantially equal duration at a rate in excess of the flicker response rate of the hyman eye, and decoder means operative in response to said strobe pulses and to said applied signal to alternately apply said electrical potential to said electrode elements as aforesaid in claim 1.

3. Apparatus in accordance with claim 1 wherein said circuit means includes a first driver circuit having a plurality of output terminals equal to the number of elements in each of said first array groups respectively connected in one-to-one correspondence to corresponding elements in each of said first array groups, a second driver circuit having a plurality of output terminals equal to the number of equipotential planes respectively connected to corresponding ones of said planes, means connecting said source of electrical potential to said first and second driver circuits, means for generating alternate first and second strobe pulses of substantially equal duration at a rate in excess of the flicker response rate of the human eye, and decoder circuit means connected to said first and second driver circuits and operative in response to said strobe pulses and to said applied signal to alternately apply said electrical potential to said electrode elements as aforesaid in claim 1.

4. Display apparatus for producing an illuminated bar having a length corresponding to the magnitude of an applied signal, said apparatus comprising: an elongated display device having upper and lower ends and provided with a first array of a plurality of groups of parallel electrode elements distributed along the length dimension of said device, each of said groups having a like number of electrode elements, a second array of equally spaced electrode elements, one for each of the groups of said first array of electrode elements, each dimensioned in the length direction of said device to span the first array electrode elements in its respective group, and a layer of electroluminescent material interposed between said first and second arrays of electrode elements; a source of electrical potential for energizing said device; and circuit means connected to said source of electrical potential and operative in response to the applied signal to alternately apply said electrical potential between the first array electrode element representing the magnitude of said applied signal and the other first array electrode elements therebelow in the group containing that electrode element and the second array electrode elements associated with that group, and between all groups of first array electrode elements lying below the above-mentioned group and all of the second array electrode elements associated with the latter groups, at a rate sufficiently high to provide an apparent continuously illuminated bar extending from the lower end of said device to that first array electrode element corresponding to the magnitude of said applied signal.

5. Apparatus in accordance with claim 4 wherein said circuit means includes first and second driver circuits each having a plurality of output terminals selectively connected to electrode elements of said first and second arrays, respectively, means connecting said source of potential to said first and second driver circuits, circuit means for generating alternate first and second strobe pulses at a rate in excess of the flicker response rate of the human eye, and decoder means connected to said driver circuits and operative in response to said strobe pulses and said applied signal to actuate said driver circuits to alternately apply said electrical potential to said electrode elements as aforesaid in claim 4.

6. Apparatus in accordance with claim 4 wherein said circuit means includes a first driver circuit having a plurality of output terminals equal to the number of electrode elements in each of said first array groups respectively connected to corresponding elements in each of said first array groups, a second driver circuit having a plurality of output terminals equal to the number of electrode elements in said second array respectively connected to corresponding ones of said second array elements, means connecting said source of potential to said first and second driver circuits, means for generating alternate first and second strobe pulses of substantially equal duration at a rate in excess of the flicker response rate of the human eye, and decoder means connected to said driver circuits and operative in response to said strobe pulses and said applied signal to actuate said driver circuits to alternately apply said electrical potential to said electrode elements as aforesaid in claim 4.

7. Apparatus in accordance with claim 4 wherein said applied signal is a binary word or words representative of the magnitude of the quantity to be displayed and wherein said circuit means includes buffer storage means for storing said applied binary word or words, a first driver circuit having a plurality of output terminals equal to the number of electrode elements in each of said first array groups respectively connected in parallel to corresponding elements in each of said first array groups, a second driver circuit having a plurality of output terminals equal to the number of electrode elements in said second array respectively connected to corresponding ones of said second array elements, means connecting said source of potential to said first and second driver circuits, pulse generating means for alternately generating first and second strobe pulses of substantially equal duration at a rate in excess of the flicker response rate of the human eye, and decoder circuit means connected between said buffer storage means and said driver circuits and operative in response to said strobe pulses and said applied binary word or words to actuate said driver circuits to alternately apply said electrical potential to said electrode elements as aforesaid in claim 4.

8. Display apparatus for producing an illuminated bar having a length corresponding to the magnitude of an applied signal, said apparatus comprising: an elongated display device having upper and lower ends and including a first array of a plurality of groups of parallel electrode elements equally spaced along the length dimension of said device, each of said groups having a like number of electrode elements, a second array of a like plurality of groups of parallel electrode elements equally spaced along the length dimension of said device, each of said groups in said second array having a like number of electrode elements, means connecting all electrode elements of each group of said second array together to form a like plurality of equipotential electrical planes, the electrode elements of said second array being dimensioned and spaced in the length direction of said device such that each equipotential plane spans a corresponding group of first array electrode elements, and a layer of electroluminescent material interposed between said first and second arrays of electrode elements; a source of electrical potential for energizing said device; and circuit means connected to said source of electrical potential and operative in response to the applied signal to alternately apply said electrical potential between the first array electrode element representing the magnitude of said applied signal and the other first array electrode elements therebelow in the group containing that electrode element and the equipotential plane of the second array associated with that first array group, and between all first array electrode elements lying below the just-mentioned group and all equipotential planes associated with said lower first array electrode elements, at a rate sufficiently high to provide an apparent continuously illuminated bar extending from the lower end of said device to that first array electrode element corresponding to the magnitude of said applied signal.

9. Apparatus in accordance with claim 8 wherein said circuit means includes first and second driver circuits each having a plurality of output terminals selectively connected to electrode elements of said first and second arrays, respectively, means connecting said source of potential to said first and second driver circuits, circuit means for generating alternate first and second strobe pulses at a rate in excess of the flicker response rate of the human eye, and decoder means connected to said driver circuits and operative in response to said strobe pulses and said applied signal to actuate said driver circuits to alternately apply said electrical potential to said electrode elements as aforesaid in claim 8.

10. Apparatus in accordance with claim 8 wherein said circuit means includes a first driver circuit having a plurality of output terminals equal to the number of electrode elements in each of said first array groups respectively connected to corresponding elements in each of said first array groups, a second driver circuit having a plurality of output terminals equal to the number of equipotential planes in said second array respectively connected to corresponding ones of said equipotential planes, means connecting said source of potential to said first and second driver circuits, means for generating alternate first and second strobe pulses of substantially equal duration at a rate in excess of the flicker response rate of the human eye, and decoder means connected to said driver circuits and operative in response to said strobe pulses and said applied signal to actuate said driver circuits to alternately apply said electrical potential to said electrode elements as aforesaid in claim 8.

11. Apparatus in accordance with claim 8 wherein said applied signal is a binary word or words representative of the magnitude of the quantity to be displayed and wherein said circuit means includes buffer storage means for storing said applied binary word or words, a first driver circuit having a plurality of output terminals equal to the number of electrode elements in each of said first array groups respectively connected in parallel to corresponding elements in each of said first array groups, a second driver circuit having a plurality of output terminals equal to the number of equipotential planes in said second array respectively connected to corresponding ones of said equipotential planes, means connecting said source of potential to said first and second driver circuits, pulse generating means for alternately generating first and second strobe pulses of substantially equal duration at a rate in excess of the flicker response rate of the human eye, and decoder circuit means connected between said buffer storage means and said driver circuits and operative in response to said strobe pulses and said applied binary word or words to actuate said driver circuits to alternately apply said electrical potential to said electrode elements as aforesaid in claim 8.

References Cited

UNITED STATES PATENTS

| | | | |
|---|---|---|---|
| 2,955,231 | 10/1960 | Aiken | 315—169 |
| 3,218,497 | 11/1965 | Motson | 315—169 |
| 3,221,169 | 11/1965 | Joline | 315—169 |
| 3,221,170 | 11/1965 | Sylvander | 315—169 |
| 3,240,990 | 3/1966 | Blank et al. | 315—169 |
| 3,263,120 | 7/1966 | Aiken | 340—324 |

NEIL C. READ, *Primary Examiner.*

A. J. KASPER, *Assistant Examiner.*